United States Patent [19]
Schmidt et al.

[11] Patent Number: 5,089,989
[45] Date of Patent: Feb. 18, 1992

[54] METHOD AND APPARATUS FOR MEASURING THE QUALITY OF A CEMENT TO A CASING BOND

[75] Inventors: Mathew G. Schmidt, Houston; Peter C. Masak, Katy; Paul B. Rhodes, Houston, all of Tex.

[73] Assignee: Western Atlas International, Inc.

[21] Appl. No.: 609,026

[22] Filed: Oct. 30, 1990

Related U.S. Application Data

[63] Continuation of Ser. No. 364,848, Jun. 12, 1989, abandoned.

[51] Int. Cl.$^5$ .............................. G01N 9/04; G01V 1/40
[52] U.S. Cl. ......................................... 367/35; 367/25; 367/911; 181/102; 181/105

[56] References Cited

U.S. PATENT DOCUMENTS

| | | | |
|---|---|---|---|
| 3,697,937 | 10/1972 | Ingram | 181/102 |
| 3,747,702 | 7/1973 | Beil | 367/35 |
| 4,703,427 | 10/1987 | Catala et al. | 367/35 |
| 4,757,479 | 7/1988 | Masson et al. | 181/105 |
| 4,809,237 | 2/1989 | Vogel et al. | 367/31 |
| 4,896,303 | 1/1990 | Leslie et al. | 367/30 |

OTHER PUBLICATIONS

Schmidt, M. G.; "The Micro CBL"; 30th Annu SPWLA Logging Symp; Denver, 6/14/89; Trans VI. Pap No. 2, 16 pp; Abst.
Albert et al.; "A Comparison of CBL, RBT and PET Logs . . ."; 62nd Annu. SPB Tech Conf.; Dallas, 9/30/87, pp. 681-689; Abst.
Leigh et al.; "Results of Field Testing . . . Tool"; 25th Annu. SPWLA Logging Symp., 6/13/84, Trans VI, 21 pp.; Abst.
Catala et al.; "A Combination of Acoustic . . . Cementations"; 59th Annu. SPB of AIME Tech Conf. 9/19/84, SPB 13139, 8 pp.; Abst.

Primary Examiner—Nelson Moskowitz
Attorney, Agent, or Firm—Darryl M. Springs

[57] ABSTRACT

A new "radial" cement bond instrument is disclosed for measuring the quality of cement to casing bond. The instrument is capable of measuring the quality of the cement bond both vertically and circumferentially. Four arrays of sectored transmitters and receivers are arranged longitudinally along the instrument body and provide a compensated radial bond measurement with high azimuthal resolution. The sectored transmitter excites both a compressional wave and a shear wave in the casing, with the beam pattern of the transmitter focused in a radial direction. The sectored receiver provides additional directivity for enhanced detection of channels in cement. The disclosed apparatus provides measurement of the quality of cement bond in eight radial segments. The resolution of the instrument provides 5 to 10 percent overlap to insure "full" coverage of the borehole. In its normal operational mode, amplitude information is recorded from the sectored receivers, an acoustic signature from a five-ft spaced transmitter-receiver is recorded, and a two-axis orientation measurement is acquired. The system also has the flexibility to acquire and record acoustic signatures from the segmented receivers.

1 Claim, 5 Drawing Sheets

METHOD AND APPARATUS FOR MEASURING THE QUALITY OF A CEMENT TO A CASING BOND

This is a continuation of application Ser. No. 07/364,848, filed June 12, 1989 now abandoned.

BACKGROUND OF THE INVENTION

This invention relates generally to methods and apparatus for measuring the quality of a cement to casing bond in a wellbore, and more specifically, to methods and apparatus for measuring the quality of the cement based both vertically and circumferentially.

Cement evaluation logs provide information regarding the presence and quality of the cement distribution around the casing in a wellbore. The objectives of the log are to verify that sufficient cement is present to support the casing and, of primary importance, to confirm that zone(s) of interest are hydraulically isolated. Casing mechanical support does not necessarily require 100 percent circumferential coverage of the casing. However, in order to hydraulically seal the formation as well as the casing, a 100 percent fill of the casing-formation annular region with a nonpermeable material must exist. Acoustic techniques have been used for many years to determine the quality of a cement bond. The early instruments relied on measuring the amplitude of the first compressional wave arrivals, propagating longitudinally from transmitter to receiver. The transmitter and receiver(s) were omnidirectional with an approximate operating frequency of 20 kHz. A relationship was established between cement compressive strength and the amplitude of the longitudinal casing acoustic compressional wave. A transmitter and receiver combination was used to measure the attenuation of the longitudinally propagating casing-borne signal. Typical casing bond logging (CBL) instruments have both a three-ft and five-ft transmitter-receiver spacing. The three-ft transmitter-receiver is used to measure the amplitude of the first compressional arrival (El). The five-ft transmitter-receiver spacing is used to produce a Variable Density Log (VDL) and/or Signature Log, a two-dimensional full-wave presentation of the received signal. The VDL/Signature presentation is used to qualitatively evaluate the cement/formation bond.

However, the amplitude of the acoustic signal between transmitter and receiver depends not only on the attenuation from the axial propagation along the casing, but also on numerous other factors which influence the amplitude of the received signal, such as:

1. Calibration. Typically, the receiver sensitivity is adjusted to provide a fixed response in "free pipe" of given casing size, casing weight, borehole fluid, and pressure. Present calibration techniques cannot eliminate all the variable conditions that are encountered in the well bore.

2. Tool Eccentering. The omnidirectional characteristics of the prior art transducers require good centralization to insure simultaneous first arrival from all azimuths. Small amounts of eccentering (X1/4 in.) can cause severe signal amplitude attenuation.

3. Temperature and Pressure Effects. At high pressure and temperature there is significant effect on transducer (ceramic and magnetostrictive) response. A 20 to 40 percent change in response can be seen with temperature variations (50°–350° F.) and pressure variations (0–20,000 psi).

4. Acoustic coupling. The acoustic coupling between transducer and casing is affected by the acoustic impedance of the transducer, well bore fluid, and casing. The acoustic impedance of a material is a function of its density and acoustic velocity. Thus the amplitude of the received signal is sensitive to borehole fluid density, viscosity, pressure, and temperature.

5. Microannulus Lack of shear coupling between cement/casing due to a microannulus will cause the amplitude of the first compressional arrival to approach the value of unsupported casing.

6. Presence of Channels. The omnidirectional characteristics of the prior art transducers make it difficult to distinguish high-strength cement with a channel (potential hydraulic communication) from an annular region with a 100 percent fill of a low-strength cement (zonal isolation, no communication).

7. Fast Formation. In fast formations, where the compressional velocity is higher than the plate mode velocity in steel (17,540 ft/sec), it is possible for the formation first arrivals to interfere with the casing first arrival. If this occurs, calibration is no longer valid.

To attempt to overcome these problems, a compensated cement bond log was developed. The compensated cement bond log included an axially-spaced pair of omnidirectional cylindrical transmitters and an axially-spaced pair of omnidirectional receivers spaced intermediate the spaced pair of transmitters. The spatial attenuation rate of the signal between each spaced transmitter and receiver pair was determined in accordance with the following relationships:

$$ATTN \text{ (dB/ft)} = \frac{10}{d} \log \frac{(A_{12} A_{21})}{(A_{11} A_{22})}$$

where:

$A_{12}$ = signal amplitude measured at receiver 1 from transmitter 2

$A_{21}$ = signal amplitude measured at receiver 2 from transmitter 1

$A_{11}$ = signal amplitude measured at receiver 1 from transmitter 1

$A_{22}$ = signal amplitude measured at receiver 2 from transmitter 2 d = axial spacing between receiver 1 and receiver 2 (ft)

However, since such cement bond tools, even the compensated CBL tools, use omnidirectional cylindrical transmitters and receivers, these instruments average the pressure wave from the full circumference of the casing and such instruments have difficulty determining the difference between cement of low compressive strength and "channels" in the cement.

Another class of prior art radial cement bonding instruments use acoustic pulse-echo techniques, in which eight ultrasonic transducers are arranged 45° from each other in a circumferential helical path around the tool housing to encompass a 360° scan. The pulse-echo transducers act as both transmitter and receiver, each transducer emitting a short pulse of ultrasonic energy and then receiving the echo from the casing. This arrangement provides eight focused measurements with very fine resolution. The presence of cement behind the casing is detected as a rapid decay of the casing resonance, while a lack of cement gives a long resonant decay as is well known in the art. However, several shortcomings are inherent in the pulse-echo technique due to the ambiguity of interpretation due to conditions that exist in the well bore:

1. Acoustic Boundaries. The pulse-echo tool responds to not only the casing/cement boundary but, in certain conditions, responds to acoustic boundaries within and beyond the cement.

2. Gas sensitivity. The presence of gas bubbles within the cement sheath or a gas-filled microannulus causes the pulse-echo type measurement to respond as if there was no cement/casing bond.

3. Mud Weight Sensitivity. The rate at which the casing resonance signal decays is a function of the acoustic impedance contrast of the medium behind the casing, and also the medium inside the casing. Typically, the acoustic impedance contrast of a high compressive strength cement and mud is high and the mud effects are insignificant. But as mud weight increases, the contrast of free pipe to bonded pipe decreases rapidly. This is specially true with low compressive strength cements.

4. Tool Eccentering. When the transducer is moved away from the center axis so that the ultrasonic beam is not normal to the casing wall, the signal is reflected away from the transducer.

5. Borehole Coverage. The amount of circumferential coverage decreases with increasing casing size. In a seven-in. casing one can expect approximately 42 percent of the casing to be measured. This drops to 30 percent in the case of a 9⅝ in. casing (assuming a spot size of one in. at 500 kHz).

Accordingly, a new radial cement bond instrument has been developed to measure the quality of cement to casing bond. The instrument is capable of measuring the quality of the cement bond both vertically and circumferentially. Four arrays of sectored transmitters and receivers arranged longitudinally along the instrument body provide a compensated radial bond measurement with high azimuthal resolution. The sectored transmitter excites both a compressional wave and a shear wave in the casing. Unlike the standard CBL measurement, the beam pattern of the transmitter is focused in a radial direction. The sectored receiver provides additional directivity for enhanced detection of channels in cement.

SUMMARY OF THE INVENTION

The present invention provides methods and apparatus for measuring the quality of a cement to casing bond in a cased cemented well bore that includes an elongated cylindrical housing adopted for disposition into the cased cemented borehole. A first array of a plurality of circumferentially spaced radially outwardly oriented acoustic transmitting transducers mounted in the housing at a first longitudinal position and a second array of a plurality of circumferentially spaced radially outwardly oriented acoustic transmitting transducers mounted in the housing at a second longitudinal position axially spaced from the first array of transmitting transducers, each of the plurality of transmitting transducers in the second array being disposed circumferentially in vertical axial alignment with a corresponding one of the plurality of transmitting transducers in the first array. The apparatus further includes a first array of a plurality of circumferentially spaced radially outwardly oriented acoustic receiving transducers mounted in the housing at a first position longitudinally spaced intermediate the first and second arrays of transmitting transducers.

A second array of a plurality of circumferentially spaced radially outwardly oriented acoustic receiving transducer mounted in the housing at a second position longitudinally spaced intermediate the first array of receiving transducers and the second array of transmitting transducers, where each of the plurality of receiving transducers in the first and second arrays are disposed circumferentially in vertical axial alignment with corresponding ones of the plurality of transmitting transducers in the first and second arrays for forming a plurality of longitudinally spaced circumferentially disposed and axially aligned combinations of a pair of spaced transmitting transducers and a pair of spaced receiving transducers spaced intermediate the pair of spaced transmitting transducers. The instrument further includes first control circuit means for activating and pulsing the transmitting transducer pairs included in each of the plurality of axially aligned transmitting/receiving transducer combinations in a continuous circumferential sequence and activating and pulsing each one of the pair of transmitting transducers included in each of the axially aligned combinations of transmitting/receiving transducers in a selected sequence. A second control circuit means is included for activating the receiving transducer pairs included in each of the plurality of axially aligned transmitting/receiving transducer combinations in a continuous circumferential sequence for enabling the receiving transducer pairs to sequentially receive transmitted pulsed signals from each one of the spaced pairs of transmitting transducers included in each of the axially aligned combinations of transmitting/receiving transducers. Data acquisition means for acquiring the acoustic signals from each of the pairs of receiving transducers received sequentially from each one of the spaced pairs of transmitting transducers included in each of the axially aligned combinations o transmitting/receiving transducers, and signal processing means receiving the acquired received acoustic required data for determining a radial compensated cement bond spatial attenuation measurement for each of the plurality of axially aligned combinations of transmitting/receiving transducer pairs are also included.

BRIEF DESCRIPTION OF THE DRAWINGS

In order that the manner in which the above-recited advantages and features of the invention are attained can be understood in detail, a more particular description of the invention can be had by reference to specific embodiments thereof which are illustrated in the accompanying drawings, which drawings from a part of this specification.

In the drawings.

DETAILED DESCRIPTION OF THE PREFERRED EMBODIMENTS

Figure 1:
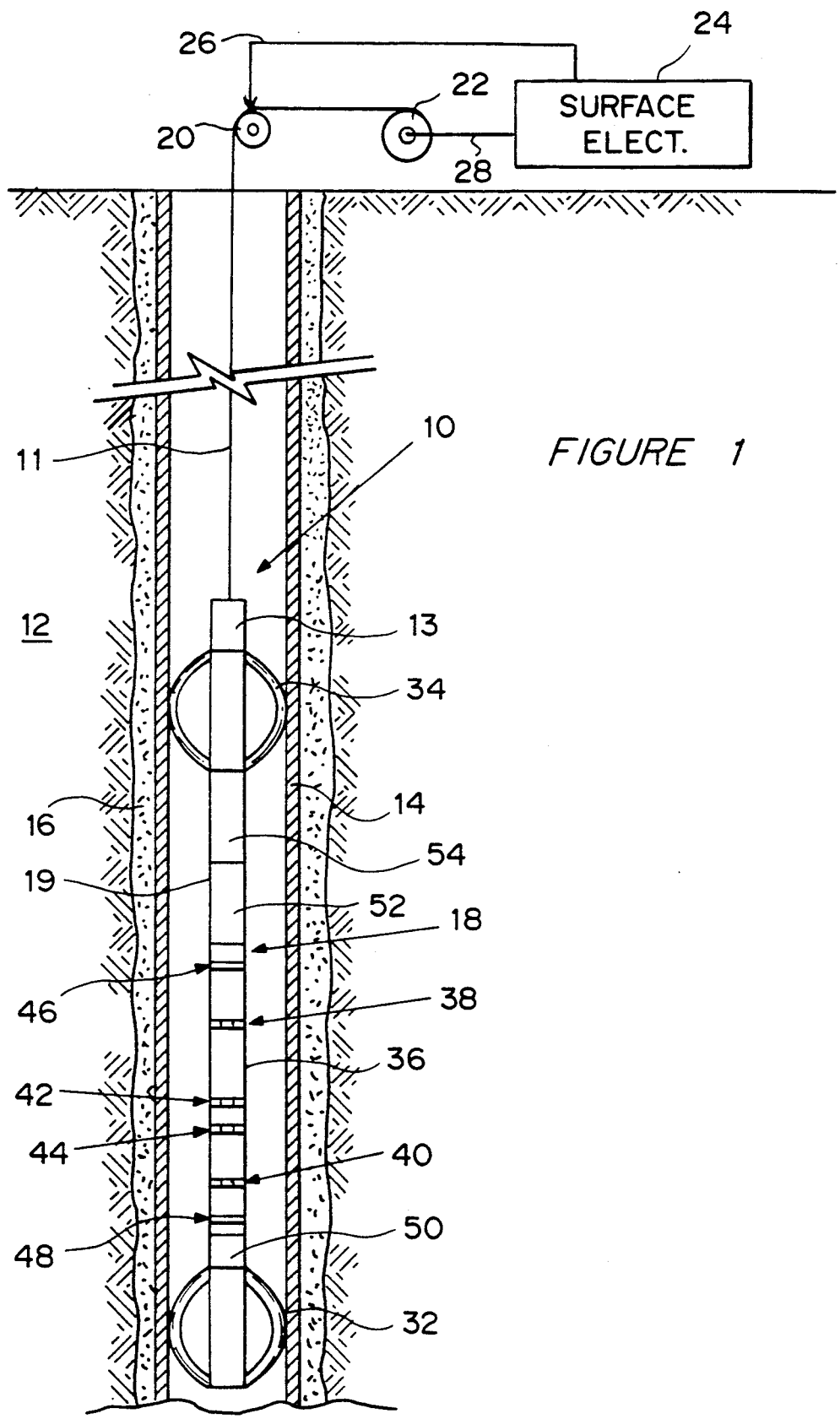
FIG. 1 is a side elevational view, partly in cross-section, of an apparatus for measuring the quality of a cement to casing bond in a borehole in accordance with this invention and shown disposed within a cased borehole.

Referring now to the drawings, and particularly to FIG. 1, a borehole 10 is shown disposed in a formation 12 and having casing 14 set therein and structurally held in place by a cement sheath 16. The radial cement bond logging (CBL) instrument 18 according to this invention is shown disposed in the borehole 10. The instrument 18 is supported in the borehole by a wireline cable 11 that passes over a sheave 20 and is spooled on a drum 22. Electrical communication between the surface and the instrument 18 is provided by the wireline 11 and is connected to the tool through connecting sub 13 and to surface electronics 24 via line 28 interconnected to the spool or reel 22.

The instrument 18 includes a pair of spaced centralizer sections 32 and 34 for centralizing the tool in the casing during its movement through the borehole. The instrument further includes an elongated cylindrical housing 19 carrying a transducer array section 36 including a first array of segmented transmitting transducers 38, a second array of segmented transmitting transducers 40 and a pair of arrays of segmented receiving transducers 42 and 44 disposed intermediate the transmitter arrays 38 and 40. Spaced longitudinally below the second transducer array 40 in an omnidirectional acoustic transmitter transducer 48, and spaced longitudinally above the first transmitter array 38 is an omnidirectional acoustic receiver transducer 46 for purposes to be hereinafter further described. The instrument also includes a transmitter electronics section 50, a receiver electronics section 52 and a downhole signal processing and storage section 54. The signals representative of the radial cement bond spatial attenuation signals having traversed the borehole casing are processed and stored in section 54 for presentation to the surface electronics 24 upon command.

Figure 2:
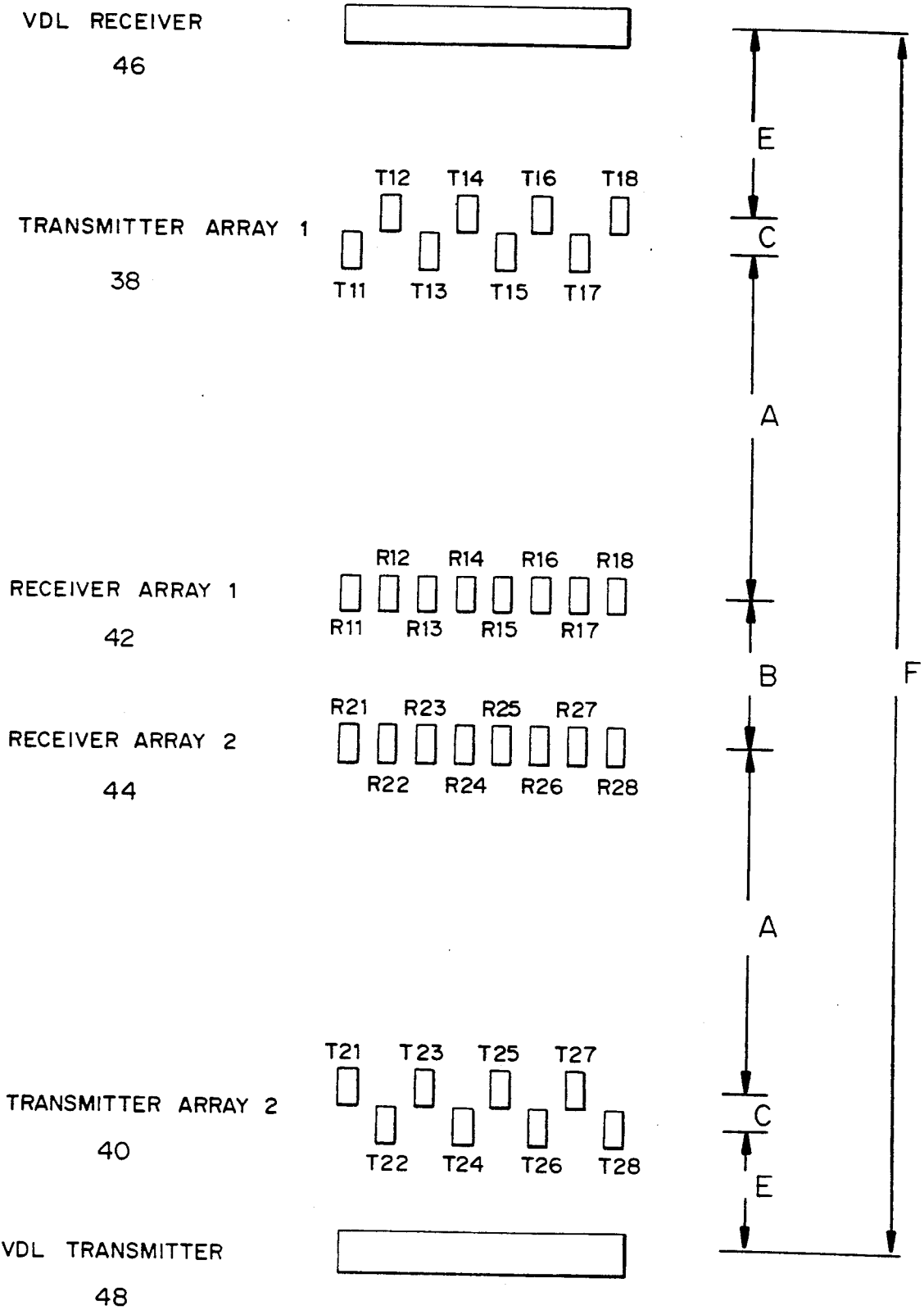
FIG. 2 is a diagrammatic view of the transmitter and receiver transducer configuration in the instrument according to this invention.

Referring now to FIG. 2, the spatial layout and relationship of the transmitter and receiver transducers mounted in the transducer array section 36 (as shown in FIG. 1) is shown. The first transmitter array 38 includes eight circumferentially spaced and radially outwardly oriented acoustic transmitting transducers T11, T12, T13, T14, T15, T16, T17 and T18 mounted in the housing 19 at a first longitudinal position. The eight transmitter transducers T11-T18 are radially oriented along spaced radial azimuths 45° apart and may be sequentially offset or staggered from the transverse plane defined by the array by a small distance "C".

The second transmitter array 40 includes eight circumferentially spaced and radially outwardly oriented transmitting transducers T21, T22, T23, T24, T25, T26, T27 and T28 mounted in the housing 19 at a second position longitudinally spaced from the first transducer array 38. The eight transmitter transducers T21-T28 are radially oriented along spaced radial azimuths 45° apart and are in vertical alignment with respective ones of the transducers T11-T18 of the first transducer array 38. Transducers T21-T28 may also be sequentially offset or staggered from the transverse plane defined by the array by a small interval "C".

The first receiver array 42 includes eight circumferentially spaced and radially outwardly oriented acoustic receivers R11, R12, R13, R14, R15, R16, R17 and R18 mounted in the housing 19 at a position longitudinally spaced intermediate the first and second transmitter arrays 42 and 38, and spaced from the first transmitter array 38 by a predetermined longitudinal distance "A". The second transducer array 44 includes eight circumferentially spaced and radially outwardly oriented acoustic receivers R21, R22, R23, R24, R25, R26, R27 and R28 mounted in the housing 19 at a position spaced intermediate the first receiver array 42 and the second transmitter array 40. Receiver array 44 is spaced a longitudinal distance "B" from the first receiver array 42 and from the second transmitter array 40 by a longitudinal distance "A" equivalent to the separation between first transmitter array 38 and the first receiver array 42.

Each of the receiving transducers R11-R18 and R21-R28 are disposed circumferentially in housing 19 in vertical alignment with corresponding ones of the transmitter transducers T11-T18 and T21-T28 for forming eight longitudinally aligned and longitudinally and circumferentially spaced combinations of a pair of spaced transmitting transducers and a pair of spaced receiving transducers:

| 1 | 2 | 3 | 4 | 5 | 6 | 7 | 8 |
|---|---|---|---|---|---|---|---|
| T11 | T12 | T13 | T14 | T15 | T16 | T17 | T18 |
| R11 | R12 | R13 | R14 | R15 | R16 | R17 | R18 |
| R21 | R22 | R23 | R24 | R25 | R26 | R27 | R28 |
| T21 | T22 | T23 | T24 | T25 | T26 | T27 | T28 |

An omnidirectional acoustic transmitter transducer 48 is longitudinally disposed in the housing 19 below the second transmitter transducer array 40 by a distance "E", and an omnidirectional acoustic receiver 46 is longitudinally disposed in the housing above the first transmitter transducer array 38 by the same distance or interval "E". The longitudinal separation between transmitter 48 and receiver 46 is approximately 5 ft. (interval "F") and provides the standard VDL/Signature waveform as above described.

Figure 3:
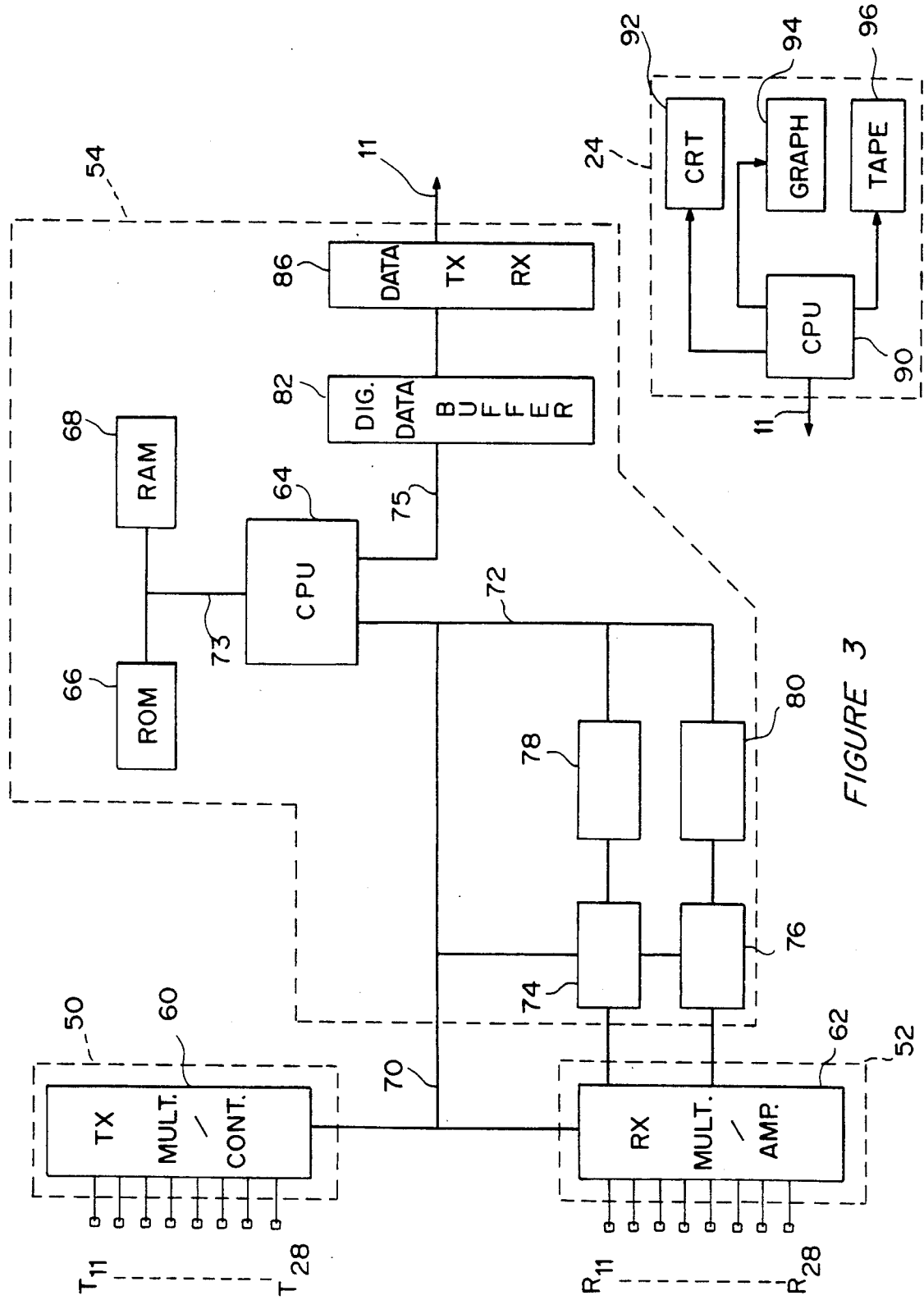
FIG. 3 is a block diagram schematic of the data acquisition and processing circuitry of the present invention.

Referring now to FIG. 3, a system block diagram for the radial cement bond logging instrument is shown. a transmitter multiplexer/control circuit 60, located in the transmitter electronics section 50, is interconnected to the first and second transmitter transducer arrays T11-T18 and T21-T28. A receiver multiplexer/amplifier circuit 62, located in the receiver electronics section 52, is interconnected to the first and second receiver transducer arrays R11-R18 and R21-R28. The pair of multiplexer circuits 60 and 62 are coupled to a downhole central processing unit (CPU) 64 through a control bus 70. The output of the first and second receiver arrays 42 and 44 are coupled through the multiplexer/amplifier circuit 62 to a pair of analog-to-digital (A/D) converter circuits 74 and 76, where the received analog acoustic signals are digitized and stored in respective FIFO registers 78 and 80, respectively. The outputs of the registers 78 and 80 are coupled to the CPU 64 via an input/output (I/0) bus 72.

The 12 MHz CPU is interconnected to a 32k byte ROM 66 and a 64k byte RAM 68 via CPU bus 73. The CPU is also interconnected via I/0 bus 75 to a digital data buffer circuit 82. The buffer circuit is interconnected to a data transmit and receive circuit 86 which couples the downhole electronics to the wireline cable 11 for transmitting data to the surface electronics 24 for processing of the signals. The surface electronics 24 include a CPU 90 for processing the received acoustic signals and to determine the radial compensated bond attenuation measurement for each of the eight vertical sectors of the casing 14 that are being scanned by the eight vertical combinations of transmitter/receiver pairs above described. The measurements may be displayed visually on a CRT 92 and/or stored on magnetic media 96. The measurements will also be graphically displayed on a log 94.

The data acquisition cycle is software controlled. An acquisition table establishes the sequence of events necessary to accumulate data. The acquisition table is transmitted from the surface computer 90. As the table is executed, the CPU 64 selects such things as the transmitter to fire, the receivers to acquire data from, amplifier gains, sample period, and the like. The CPU 64 initiates the acquisition cycle by selecting the transmitter, receivers, gains, sample period, and the number of samples for the sub cycle. The firing of a transmitter T11-T18, T21-T28 starts the cycle.

The signals from receivers R11-R18 and R21-R28 are converted to a digital word by the A/D modules 74 and 76 and stored in the respective FIFO registers 78 and 80. The CPU 64 then extracts the information from the FIFO registers 78 and 80 and stores it in RAM 68 for processing.

The data acquired by the receivers is then transmitted to the surface via the data transmit/receive circuit 86. The CPU 64 software uses an "intelligent" algorithm to determine the first arrival time of the received acoustic signal and t automatically control the system gain to insure maximum signal-to-noise.

Figure 4:
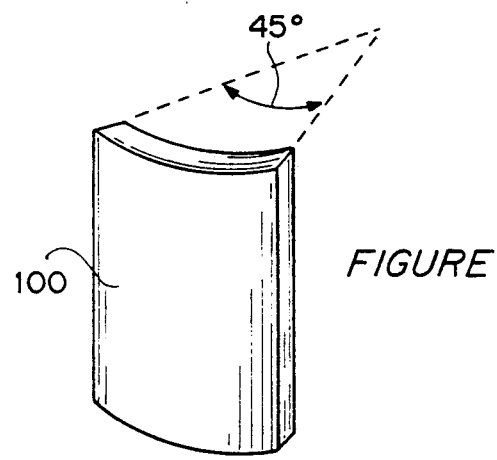
FIG. 4 is a pictorial view of the configuration of the transducers and their placement in the tool housing.

FIG. 4 is a pictorial view of the transducer configuration for both the transmitter and receiver arrays 38, 40 and 42, 44, respectively. The transducers T11-T18, T21-T28, R11-R18 and R21-R28 are preferably thickness mode curved plate transducers 100 having a 45° radial center surface curvature. Ten transducers 100 acting in a transmitter mode (T11-T18 and T21-T28) generate a compressional acoustic signal that is directed to the casing wall and propagated therethrough in a vertical direction to be received by the transducers 100 acting in a receiver mode (R11-R18 and R21-R28).

Figure 5:
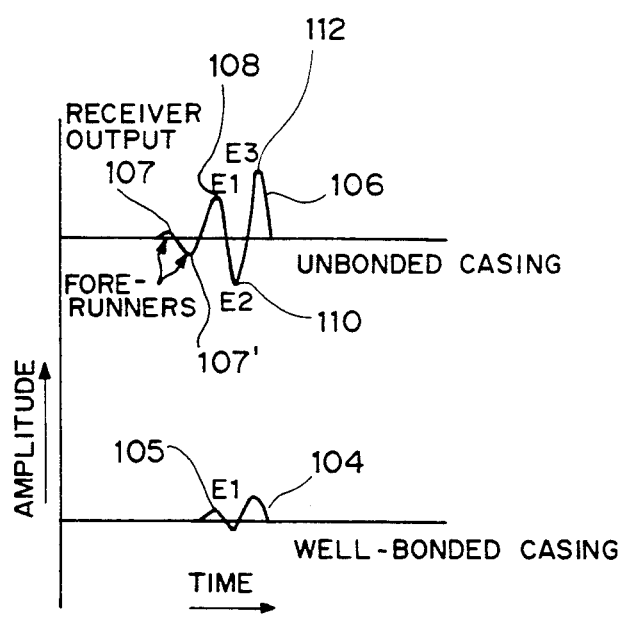
FIG. 5 is a pulse diagram showing the relative amplitudes of the received acoustic signals for unbounded and well-bonded casing.

An example of received acoustic signals for bonded and unbonded cement casing is shown in FIG. 5. For a well bonded casing a typical received signal 104 with a first arrival 105 (E1) is shown. The signal is substantially attenuated and there is substantially no ringing resonance. However, for an unbonded portion or section of casing, the received signal 106 typically will be of a substantially greater amplitude than in the case of well-bonded cement. It often exhibits "forerunner" peaks 107-107' which are not true "first arrivals" which are shown at 108 (E1). The signal exhibits a resonance and will often exhibit additional peaks such as at 110 (E2) and 112(E3).

The acoustic signals from transducers T11-T18 and T21-T28 propagate longitudinally through a 45° segment of the casing well associated with each of the eight segments or longitudinal combinations of the transmitter/receiver pairs as above described. The signal attenuation is a function of the compression strength of the cement in contact with the casing. The thickness mode curved plate transducer provides the necessary radiation pattern to provide a complete 360° radial pattern. The combination of the transducer and the curvature of the casing produces an azimuthal resolution better than 45°. The azimuthal resolution is defined as the beam width such that the intensity of the pressure field is down 10 decibels relative to the axial level (22.5° for the curved plate transducer).

Figure 6:
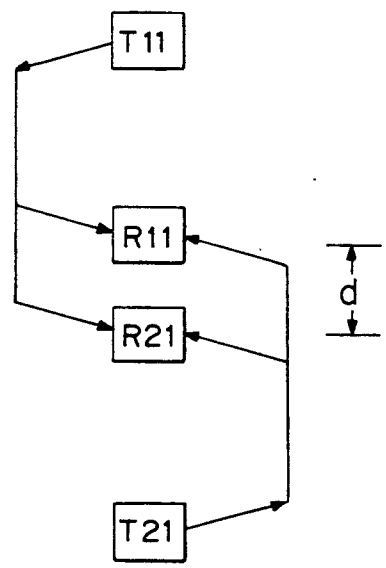
FIG. 6 is a diagrammatic view of the spatial paths of the acoustic attenuation measurements for a combination of transmitter and receiver pairs.

Referring now to FIG. 6, the spatial path of the acoustic signals between the transmitter and receiver arrays is shown. As an example, the acoustic signal from transducer T11 progresses through the casing wall 14 and is received first at R11 and then at R21. Similarly, the acoustic signal from transducer T21 propagates through casing wall 14 and is received first at R21 and then at R12. This pattern is repeated sequentially for each of the eight segments of the transducer arrays.

The data acquisition cycle of the instrument 18 is initiated by command from the surface computer 90. These commands are based on depth interrupts, with a typical sampling interval of 0.25 ft. The instrument contains two high-speed A/D modules 74 and 76 which allow the simultaneous acquisition of data from two receivers (single shot of a transmitter).

The basic operating sequence of the instrument is:

| Transmitter | Receiver(s) | Measurement |
|---|---|---|
| T11 | R11, R21 | Travel Time. Amplitude |
| T21 | R11, R21 | Travel Time. Amplitude |
| T12 | R12, R22 | Travel Time. Amplitude |
| T22 | R12, R22 | Travel Time. Amplitude |
| T13 | R13, R23 | Travel Time. Amplitude |
| T23 | R13, R23 | Travel Time. Amplitude |
| . | . | . |
| . | . | . |
| . | . | . |
| T28 | R18, R28 | Travel Time. Amplitude |
| VDLTX48 | DLRX48 | VDL/Signature Waveform |

The principal measurement of the instrument is eight compensated bond attenuation measurements, one for each vertical segment of the casing wall 14 that is traversed by the tool. These data can be used to derive a cement map, normalize three-ft amplitude, and determine the average attenuation curve.

The radial compensated bond attenuation measurement for each longitudinal sector is calculated by the computer 90 as follows:

$$CAT_n = \frac{20 \times \log[(A_{12n} \times A_{21n})/(A_{11n} \times A_{22n})]}{d} - DBSPRD$$

where $A_{12n}$ = amplitude measured at receiver 1n from firing of transmitter 2n $A_{21n}$ = amplitude measured at receiver 2n from firing of transmitter 1n $A_{11n}$ = amplitude measured at receiver 1n from firing of transmitter 1n $A_{22n}$ = amplitude measured at receiver 2n from firing of transmitter 2n n = sector number n = 1, 2, 3, . . . 8 d = spacing between receiver 1n and receiver 2n (ft)

$CAT_n$ = radial compensated bond attenuation measurement

DBSPRD = spreading loss in dB/ft

Experimental data has been obtained through a prototype instrument that was similar to the instrument transducer arrays described above, but was simpler in construction. The prototype instrument utilized a single array of eight transmitters and eight receivers ($T_{1n}$ and $R_{1n}$). The main objective for the prototype instrument was to verify its ability to detect and measure channels in actual logging environments.

In order to confirm the results, it was necessary to choose wells with known cement conditions. Tests were run on a test well having knowing man-made channels.

Figure 7:
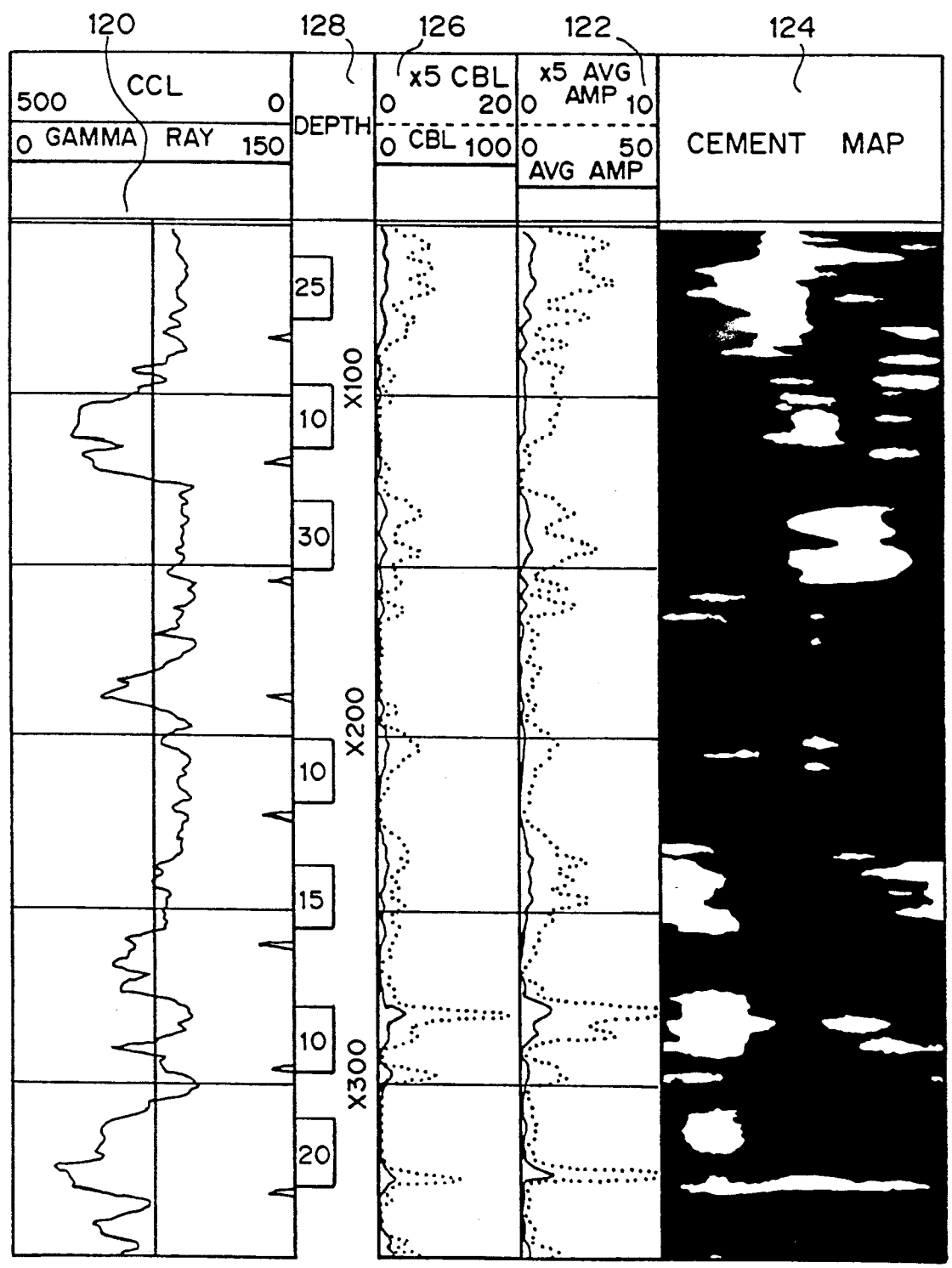
FIG. 7 is a pictorial view of a test radial cement bonding log obtained according to this invention.

Data from logging the test well are presented in FIG. 7. The standard CCL and Gamma Ray curves are presented in the far left track 120. In the two far right tracks, 122 and 124, data from the prototype instrument are presented. The AVG AMP is the average amplitude from the eight segments. The curve is derived from the average of the eight attenuation measurements (dB/ft). The amplitude shown is for a "three-ft" transmitter-receiver spacing. In the far right track 122 the eight amplitude measurements are used to generate the cement map, which is an "image" of the casing-to-cement bond, unfolded. The vertical scale is 0 to 360 degrees. The quality of the bond is depicted as grey scale tones. Black represents a bond of greater than 80 percent of maximum strength. White represents a strength of less than 20 percent of maximum. The boundaries of the other shade levels are linearly spaced between these values.

The "CBL" curve shown in track 126 is the standard three-ft amplitude measurement from a three-ft standard omnidirectional transmitter-receiver transducer pair. Over the zone presented, the correlation is excellent. The relative amplitude differences of the two amplitude curves are due to calibration methods. The actual size and location of the man-made channels are labeled in the depth track 128 of the log. The cement map presentation in track 124 clearly identifies all of the man-made channels.

Many modifications and variations beside those specifically mentioned may be made without departing substantially from the concept of the present invention. Accordingly, it should be clearly understood that the forms of the invention described and illustrated herein are exemplary only and are not intended as limitations on the scope of the present invention.

We claim:

1. Apparatus for measuring the quality of a cement to casing bond in a cased cemented wellbore, comprising:
    an elongated cylindrical housing adapted for disposition into the cased cemented borehole;
    a first array of a plurality of circumferentially spaced radially outwardly oriented acoustic transmitting transducers mounted in said housing at a first longitudinal position;
    a second array of a plurality of circumferentially spaced radially outwardly oriented acoustic transmitting transducers mounted in said housing at a second longitudinal position axially spaced from said first array of transmitting transducers, each of said plurality of transmitting transducers in said second array being disposed circumferentially in vertical axial alignment with a corresponding one of said plurality of transmitting transducers in said first array;
    a first array of a plurality of circumferentially spaced radially outwardly oriented acoustic receiving transducers mounted in said housing at a first position longitudinally spaced intermediate said first and second arrays of transmitting transducers;
    a second array of a plurality of circumferentially spaced radially outwardly oriented acoustic receiving transducers mounted in said housing at a second position longitudinally spaced intermediate said first array of receiving transducers and said second array of transmitting transducers;
    each of said plurality of receiving transducers in said first and second arrays being disposed circumferentially in vertical axial alignment with corresponding ones of said plurality of transmitting transducers in said first and second arrays for forming a plurality of longitudinally spaced circumferentially disposed and axially aligned combinations of a pair of spaced transmitting transducers and a pair of spaced receiving transducers spaced intermediate said pair of spaced transmitting transducers;
    first control circuit means for activating and pulsing said transmitting transducer pairs included in each of said plurality of axially aligned transmitting-/receiving transducer combinations in a circumferential sequence and activating and pulsing each one of said pair of transmitting transducers included in each of said axially aligned combinations of transmitting/receiving transducers in a selected sequence,
    second control circuit means for activating said receiving transducer pairs included in each of said plurality of axially aligned transmitting/receiving transducer combinations in a circumferential sequence corresponding to said sequence for activating and pulsing said transmitter pairs for enabling said receiving transducer pairs to sequentially receive transmitted pulsed signals from each one of said spaced pair of transmitting transducers included in each of said axially aligned combinations of transmitting/receiving transducers,
    data acquisition means for acquiring said acoustic signals from each of said pairs of receiving transducers received sequentially from each one of said spaced pairs of transmitting transducers included in each of said axially aligned combinations of transmitting/receiving transducers; and
    signal processing means receiving said acquired received acoustic signal data for determining a radical compensated cement bond spatial attenuation measurement for each of said plurality of axially aligned combinations of transmitting/receiving transducer pairs.

* * * * *